United States Patent [19]

Newman, Jr.

[11] 3,882,970

[45] May 13, 1975

[54] IMPACT ABSORBING STRUCTURE

[75] Inventor: Ritchey O. Newman, Jr., Midland, Mich.

[73] Assignee: The Dow Chemical Company, Midland, Mich.

[22] Filed: Oct. 15, 1973

[21] Appl. No.: 406,712

[52] U.S. Cl.................... 188/1 C; 293/62; 296/152
[51] Int. Cl............................................... F16f 7/12
[58] Field of Search............. 49/502, 503; 188/1 C; 280/150 B; 293/62, 70; 296/152

[56] References Cited
UNITED STATES PATENTS

| | | | |
|---|---|---|---|
| 2,788,090 | 4/1957 | Sadtler | 188/1 C |
| 3,232,383 | 2/1966 | Son Moberg | 188/1 C |
| 3,700,076 | 10/1972 | Forsting et al. | 188/1 C |
| 3,718,364 | 2/1973 | Fischer et al. | 293/62 UX |

FOREIGN PATENTS OR APPLICATIONS

| | | | |
|---|---|---|---|
| 472,071 | 3/1951 | Canada | 188/1 C |
| 1,109,578 | 9/1955 | France | 188/1 C |

Primary Examiner—Duane A. Reger
Attorney, Agent, or Firm—Robert B. Ingraham

[57] ABSTRACT

An impact absorbing structure is provided which is capable of high deflection and is particularly suited for use in automobile doors. Two strap portions are affixed to opposed frame members and a displacable beam is disposed over the strap members between the frame and the members and means to resist movement of the strap members is provided to give a desired predetermined resistance to movement of the beam inwardly between the frame members.

6 Claims, 5 Drawing Figures

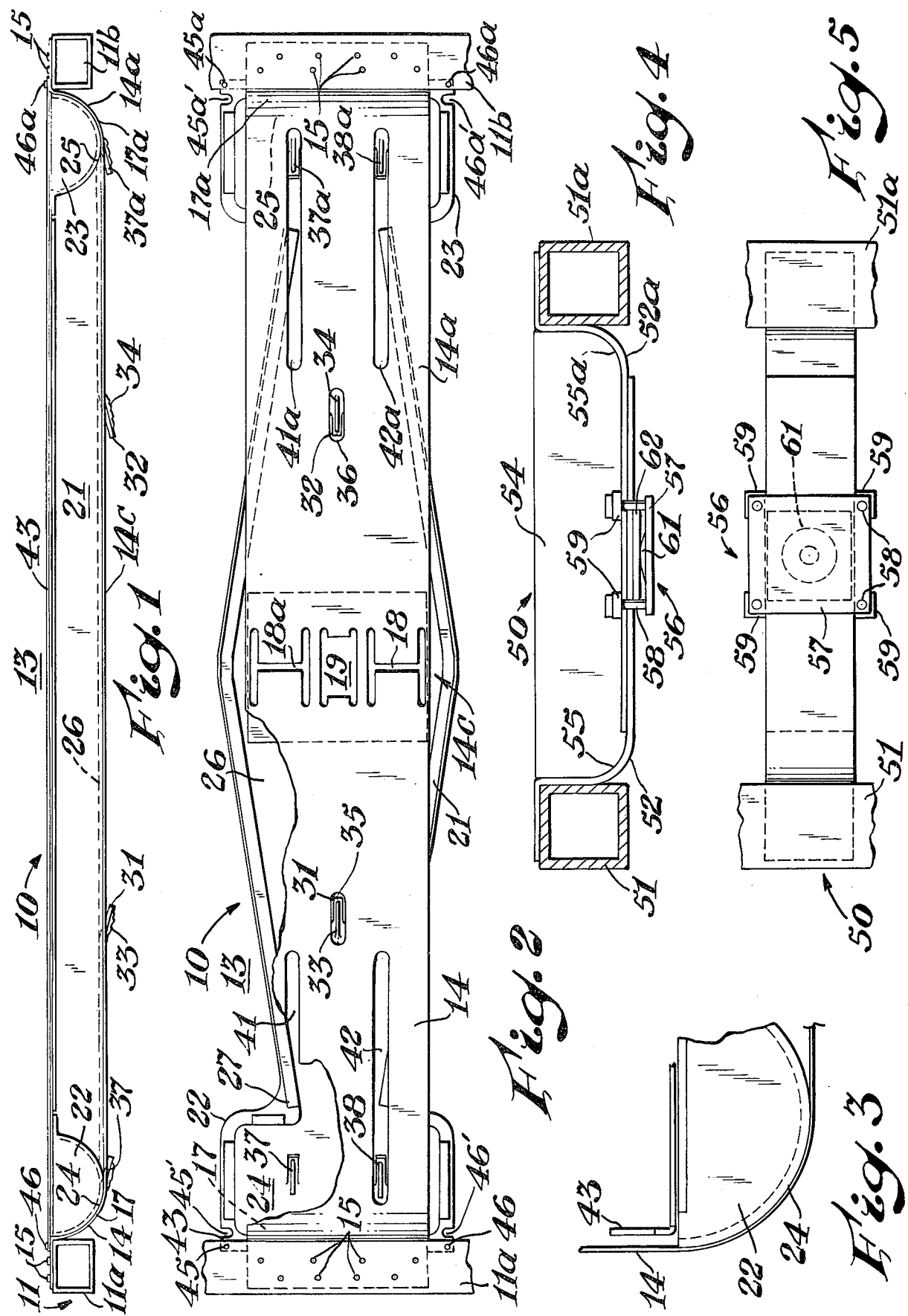

IMPACT ABSORBING STRUCTURE

Road vehicles such as automobiles and the like in the past generally have offered relatively little protection to an occupant from side impact. A collision wherein, for example, a vehicle impacts another vehicle in the region of a door, can result in crumpling of the sheet metal door structure with relatively little force and the door or portions thereof would be forced inwardly into the vehicle in such a manner that the occupant is severly injured. Various attempts have been made to increase the strength of vehicle doors such as automobile doors by the incorporation of reinforcing members. Such reinforcing members generally are either sheet metal channels or corrugated sheet metal bodies wherein the channels or corrugations extend generally horizontally within the door. Such reinforcement offers some benefits and protection to the occupants of the vehicle. However, once such channel or corrugated member is deflected sufficiently to buckle, the resistance to further penetration by the colliding object often decreases rapidly and therefore they offer protection only under conditions where the force of the collision is less than that which is required to cause significant buckling. Flexible synthetic resinous composite beam structures have been proposed. However, such structures have two significant disadvantages, one is in the initial cost, and the second is that due to the use of highly resilient plastic/glass fiber composite beams substantial energy is stored in the form of a plastic composite spring which is often quite disadvantageous in the case of impact.

It would be desirable if there was available an improved construction which would offer substantial resistance to impact.

It would also be desirable if there was available an improved door construction for automobiles which would provide substantial resistance to impact and which would deflect to a substantial degree without a decrease in the impact resisting force.

It would further be desirable if such a door or vehicular side member were available which could be fabricated employing readily available materials.

These benefits and other advantages in accordance with the present invention are achieved in a structure which is subject to impact, the structure having at least a supporting frame, the supporting frame enclosing therein a region of probable impact, first and second frame portions generally oppositely disposed and having therebetween a region of probable impact, at least one deformable strap means disposed against and affixed to each frame portion, a beam member extending generally between the frame portions generally adjacent said straps and at least one strap movement resisting means in engagement with said strap permitting sliding motion of the said strap over said beam and offering a generally predetermined resistance to movement of the strap over the beam.

Further features and advantages of the present invention will become more apparent from the following specification taken in connection with the drawing wherein:

FIG. 1 is a schematic view of an energy absorbing assembly in accordance with the present invention.

FIG. 2 is a second view of the assembly of FIG. 1.

FIG. 3 is a fractional view of a portion of the assemblies of FIGS. 1 and 2 after impact.

FIGS. 4 and 5 are two views of an assembly in accordance with the present invention.

In FIGS. 1 and 2 there is schematically depicted an edge and rear view of an impact absorbing asembly in accordance with the present invention generally designated by the reference numeral 10. The assemblies 10 comprise in cooperative combination a frame 11 having a first frame member 11a and an oppositely disposed frame member 11b. The frame members 11a and 11b have disposed therebetween a region of probable impact designated by the reference numeral 13. Beneficially, the frame member 11 is utilized as a portion of an automobile door assembly. A first strap member portion 14 is affixed to the frame member 11a and a second strap member portion 14a is affixed to the frame member 11b. The portions 14 and 14a are affixed to the frame by any suitable fastening means such as rivets 15, welding or like well known fastening means. As depicted in FIGS. 1 and 2, the strap portions 14 and 14a have curved beam engaging portions 17 and 17a. The strap portions 14 and 14a are joined at a generally central location 14c and define therein a plurality of perforations which is a region of minimal strength having defined therein perforations or cutouts 18, 19 and 18a. As depicted in FIGS. 1 and 2, a beam 21 is in operative engagement with the strap portions 14 and 14a. The beam 21 has a first end 22 and a second end 23. The end 22 is generally adjacent the frame portion 11a and the end 23 adjacent the frame portion 11b. The beam member 21 has a generally outwardly tapering configuration from its centermost portion in a plane containing the frame members and terminates in curved friction surfaces 24 and 25 generally adjacent the frame members 11a and 11b, respectively. The friction surfaces are in contact with the strap portions 14 and 14a, respectively. The beam 21 comprises a pan portion 26 of generally U-shaped hollow configuration wherein the legs of the U terminate in a generally planar circumferential flange 27. The pan portion 26 defines first and second cutter assemblies or first and second strap motion retarding means 31 and 32. The strap motion retarding means 31 and 32 are integrally formed from the pan 26 by flexing outwardly a portion of the material of the pan and are reinforced by weld beads 33 and 34. The cutting assemblies 31 project through openings 35 and 36, respectively, defined in the strap portions 14 and 14a, respectively. Similar cutting means 37 and 37a, 38 and 38a are formed in the pan 26 at a location generally adjacent the ends 22 and 23, respectively, and are disposed within elongate slots 41, 41a, 42 and 42a, respectively. The beam 21 has a generally planar member 43 extending the entire length thereof and affixed to the flange 27 about the periphery thereof conveniently by spot welding or other similar connecting means. The planar member 43 extends beyond the pan 26 and is affixed to the frame members 11a and 11b by low strength connections 45, 45a, 46 and 46a, respectively. Adjacent the low strength connecting means 45, 45a, 46 and 46a are formed notches 45', 45a', 46' and 46a'.

In operation of the assembly of FIGS. 1 and 2, under normal conditions; i.e., non-impacted, the beam 21 is maintained between the frame member portions 11a and 11b by means of the portions 43 and 43a which are affixed to the frame members by low strength rivets or other convenient attaching means such as spot welding, adhesives and the like. On impact of the beam 21 applied to the planar member 43, directed downwardly as depicted in FIG. 1 and towards the observer and out of the plane of the paper as depicted in FIG. 2, the portions 43 and 43a fold upwardly as depicted in the fractional view shown in FIG. 3, the strap portions 14 and 14a separate at a location generally corresponding to the perforations 18, 18a and 19. The ends of the slots 35 and 35a adjacent the cutting assemblies 31 and 32 engage the cutting assemblies and as the beam 21 is forced out of the plane of the frame 11 strips are sheared from the portions 14 and 14a while the portions 14 and 14a slide over the curved surfaces 24 and 24a, respectively, thus providing a predetermined and controlled resistance to movement. After substantial movement, the cutters 37, 38, 37a and 38a also engage the ends of the corresponding slots in the strap portions 14 and 14a, respectively, and effectively double resistance to movement of the beam 21 in the event that cutters 31 and 32 disengage from the strap portions, or triple the resistance if cutters 31 and 32 are still engaged. Thus, utilizing the principles illustrated in FIGS. 1 and 2, almost any desired pattern of resistance to beam movement may be obtained by appropriate selection of the number and placement of the cutters and the sequence of engagement or disengagement of the cutters with the strip portions as the beam is displaced. By employing a pattern such as is depicted in FIG. 2, tilting of the beam is reduced if the force is applied generally adjacent to but not at the center of the beam.

In FIGS. 4 and 5 there are depicted two views of an alternate embodiment of the present invention generally designated by the reference numeral 50. The embodiment 50 comprises first and second frame member portions 51 and 51a. A first flexible strap or strap portion 52 is rigidly affixed to the frame member 51 and a second flexible strap or strap portion 52a is affixed to the frame member 51a. The straps 52 and 52a remote from the frame members to which they are attached are disposed in overlapping relationship. A beam 54 is disposed between the frame members 51 and 51a. The beam 54 has a first curved strap engaging end 55 and a second strap engaging end 55a having a generally curved configuration. The ends 55 and 55a are in engagement with straps 52 and 52a adjacent the members 51 and 51a, respectively. As depicted in FIG. 4, the straps 52 and 52a remote from their points of attachment or associated frame members are displaced to a location generally opposite or remote from their location of attachment to the frame members. A clamping assembly 56 is affixed to the beam 54. The assembly 56 comprises a first clamping plate 57 remotely disposed from the beam 54, a plurality of tie members or bolts 58 in operative engagement with lugs 59 affixed to the beam 54. A spring or resilient tensioning means 61 is in operative engagement with the plate 57. The resilient tensioning means 61 is located between the plate 57 and the beam 54. The tensioning means 61 is in operative engagement with a pressure plate or strap engaging means 62 which serves to clamp the straps 52 and 52a between the pressure plate 62 and the beam 54.

The embodiment of FIGS. 4 and 5 when subjected to impact such as impact on the beam 54 at a location remote from the frame members 51 and 51a and remote from the clamping assembly 56, resists movement of the beams until force has been applied which is sufficient to permit the straps 51 and 52 to slide about the curved ends 55 and 55a against the pressure plate 62, against each other and the adjacent surface of the beam 54. By selecting the appropriate spring tension for the tensioning means 61, the force required for displacement of the beam can be varied within wide limits.

Either of the embodiments of the present invention are readily constructed from a wide variety of materials. For many applications, particularly those in the automotive field, steel is eminently satisfactory. The straps or strap portions beneficially employ a low carbon, readily deformable steel such as SAE 1010 grade, whereas the cutting assemblies employed in the embodiment of FIGS. 1 and 2 desirably are of a harder steel such as SAE 1060 if it is desired that a substantial length of strip be cut. The cutting assemblies may be integral as depicted in FIG. 1; they may be riveted or hard-surfaced, depending upon the particular type of service which is required. Advantageously, a thin overlay of hard steel on the cutting face can be eiminently satisfactory for many purposes. The embodiment of FIGS. 4 and 5 are particularly tolerant of the dimensional variations in the straps and lack of parallelism between the clamping surfaces. The frictional resistance is primarily dependent upon the force applied and within reasonable limits; that is, the rupture strength of the straps, and is more or less independent of the actual area in contact.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A structure which is subject to impact, the structure having
    at least a supporting frame, the supporting frame enclosing therein
    a region of probable impact,
    first and
    second frame portions generally oppositely disposed and having therebetween
    the region of probable impact,
    at least one deformable strap means disposed against and affixed to each frame portion,
    a beam member extending generally between the frame portions generally adjacent said straps, the beam member terminating in curved friction surfaces, and
    at least one strap movement resisting means in engagement with said strap permitting sliding motion of the said strap over said beam curved friction surfaces and offering a generally predetermined resistance to movement of the strap over the beam.

2. The structure of claim 1 wherein the strap movement resisting means is a cutter adapted to cut a strip from the strap means.

3. The structure of claim 1 wherein the strap movement resisting means is at least first and second members compressing the strap means therebetween.

4. The apparatus of claim 2 wherein the strap means defines at least one opening and a beam member supported cutting element projecting into said opening.

5. The structure of claim 1 wherein the strap means is a continuous strap having an area of maximum weakness generally centrally disposed between the frame portions.

6. The structure of claim 3 wherein the strap means consists generally of a first strap portion affixed to the first frame portion, a second strap portion affixed to the second frame portion and first and second strap portions remote from the first and second frame portions are in overlapping relationship, and means to resiliently urge said strap portions together in face to face relationship.

* * * * *